Oct. 24, 1967   G. K. BROKAW   3,348,320
PHONETIC TEACHING DEVICE
Filed Dec. 14, 1964   4 Sheets-Sheet 3

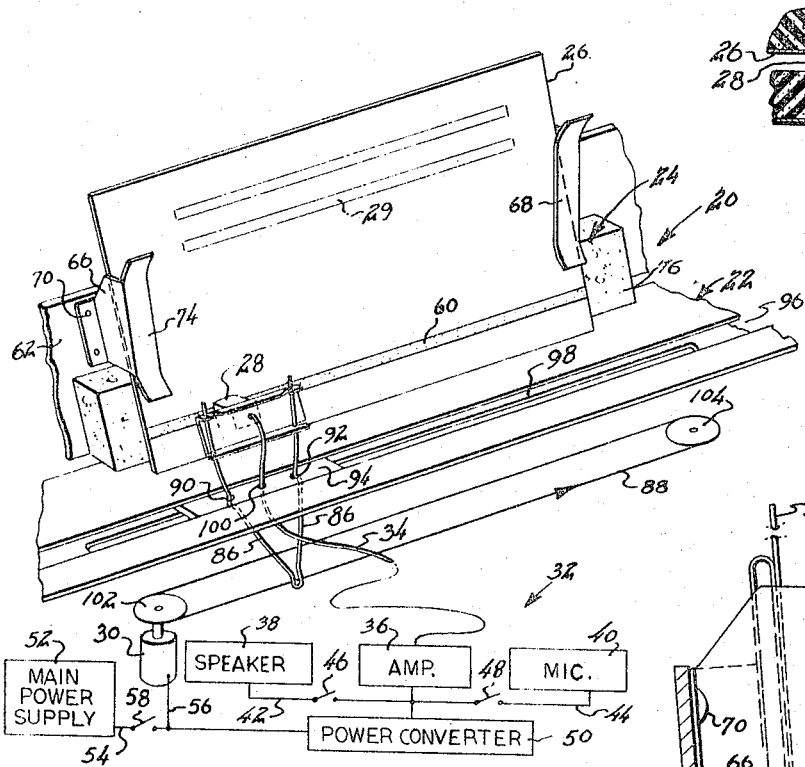

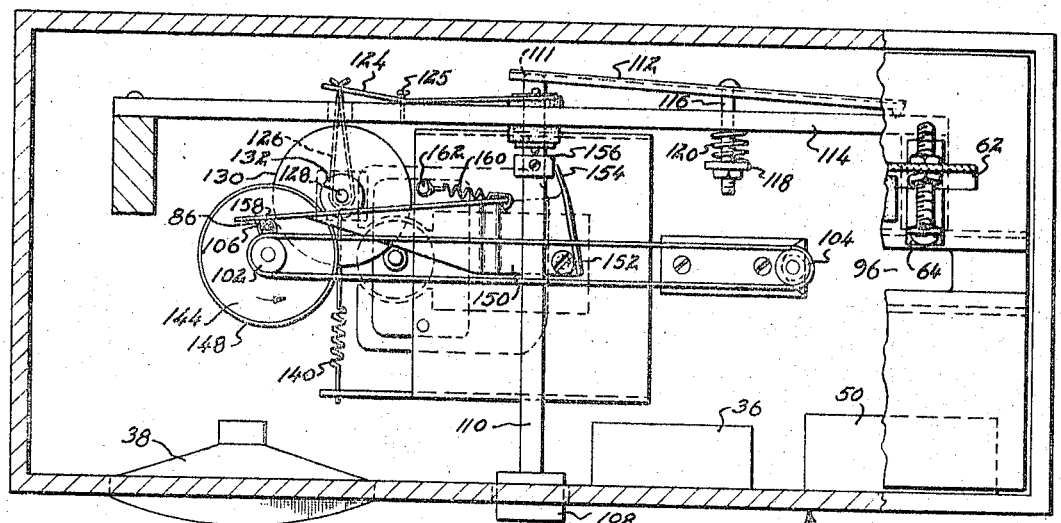

INVENTOR.
GEORGE K. BROKAW
BY
Owen, Wickersham & Erickson
ATTYS.

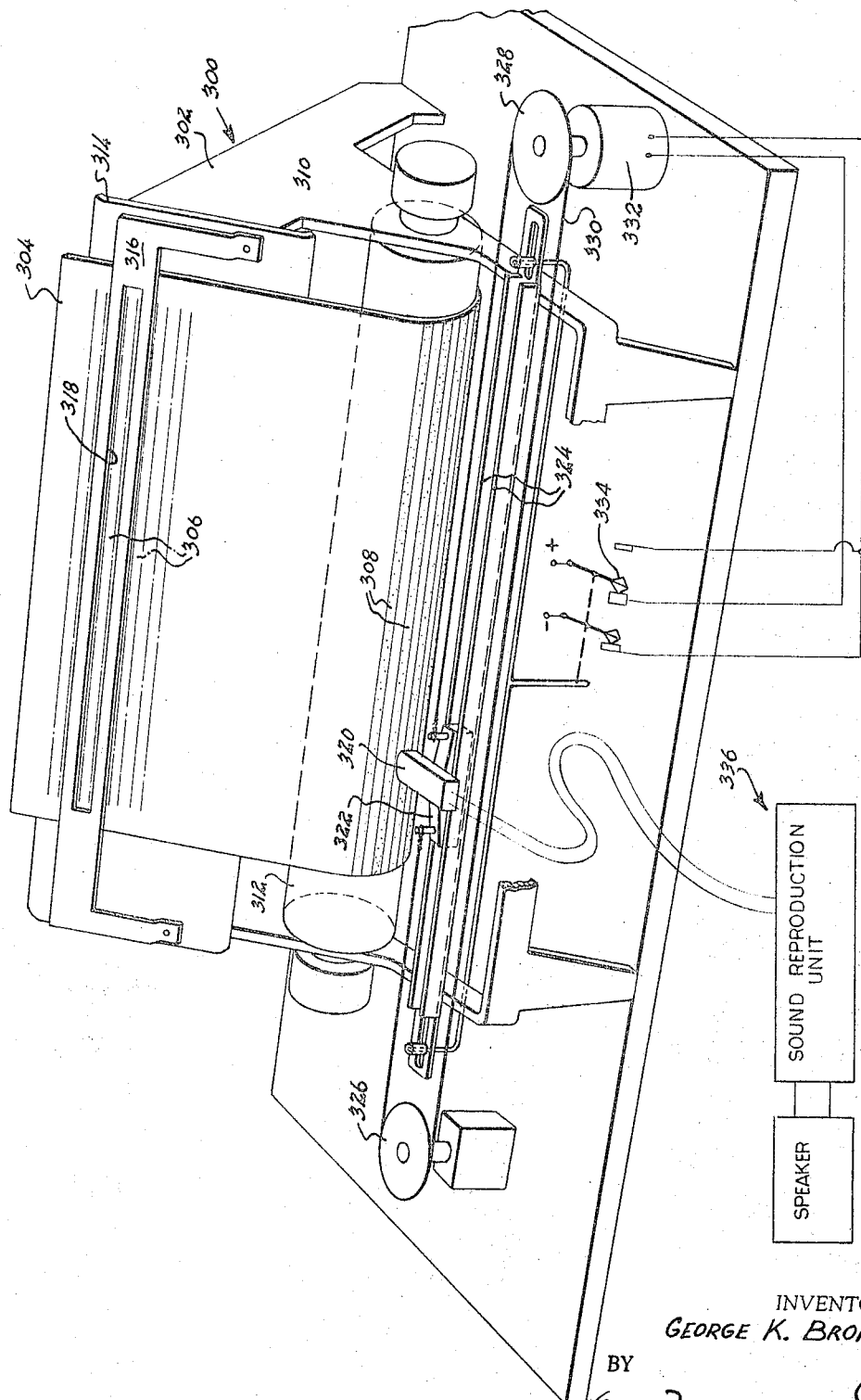

United States Patent Office 3,348,320
Patented Oct. 24, 1967

3,348,320
PHONETIC TEACHING DEVICE
George K. Brokaw, 110 Forest Lane,
Berkeley, Calif. 94708
Filed Dec. 14, 1964, Ser. No. 418,103
11 Claims. (Cl. 35—35)

ABSTRACT OF THE DISCLOSURE

A teaching device is disclosed for use with a card or sheet having one or more strips of magnetic recording tape and capable of being printed with indicia associated with audio material on the tape. The device includes a magnetic pickup head which is movable at a constant predetermined linear rate in a straight line while being urged against the tape segment. It also includes means for either retracting the magnetic head away from the tape on a return movement or alternatively of shifting vertically so as to engage another channel on the tape during a return trip. The device also includes a feed means for handling sheets or cards with a plurality of spaced apart tape segments and means for indexing lines of tape into register with the reciprocating pickup head.

---

This invention relates to a phonetic teaching apparatus, and particularly one that is useful for teaching languages and in establishing the correct and authoritative pronunciations and elocution of phases and words.

Among the various teaching methods, the combination of a visual presentation associated simultaneously with an audible presentation is well known to be highly effective, particularly in the teaching of languages where correct pronunciation and elocution are essential. Another factor that aids the aforesaid basic method is a capacity to provide a repetition of the simultaneous visual and audible presentations. A general object of the present invention is to provide an apparatus capable of producing the aforesaid functions and which, therefore, is highly useful as a teaching or training device.

A further general object is to provide a teaching device of the aforesaid type that is relatively small in size, light in weight, and which can be operated easily by one person.

A more specific object of the invention is to provide a phonetic sound producing device that makes it possible for one to observe clearly a word or phrase while this word or phrase is simultaneously being pronounced audibly through a sound reproduction system, thereby enabling the student to correlate the spelling of the word or phrase with the correct pronunciation or elocution thereof.

My apparatus is adapted for use with a series of teaching cards or sheets to each of which is fixed a strip of magnetic recording tape or some equivalent material. Located above the strip of tape is a line of written or printed matter consisting of a word or words corresponding to the material prerecorded on the strip. When being held for use in a fixed position by my teaching device, the student can observe clearly the word or phrase being studied while the same word or phrase is pronounced audibly through a sound reproduction unit in the device. In general structural terms, my invention comprises the combination of: a means for receiving a card or sheet and holding it in a predetermined fixed position so that its upper portion having written or printed indicia can be easily viewed; a magnetic pickup head connected to a sound reproduction system; means for supporting the pickup head for lineal travel along a path adjacent to the tape segment on the card or sheet being held; means for driving the pickup head along the aforesaid lineal path while said head is engaged with the tape segment; means for initiating the driving means; and means for returning the pickup head to its starting position.

Still another object of my invention is to provide a teaching apparatus of the aforesaid general type wherein a movable magnetic pickup head bears against a strip of recording tape on a teaching card that is held stationary by the apparatus, and travels at a constant linear speed during a traverse in one direction along the tape strip, and is automatically retracted away from the tape strip on a return traverse in the opposite direction while uninterrupted electrical power is supplied to both the motor and a sound reproduction unit in the apparatus.

Another object of my invention is to provide a teaching device of the aforesaid type wherein the teaching card having the written phrase being studied remains fixed and the device can be recycled to repeat audibly the phrase on the card without the necessity of handling the card before each cycle.

Another object of the present invention is to provide a teaching device capable of audibly pronouncing long phrases by automatically switching and reversing the direction of traverse of the magnetic pickup head and also switching the track of the sensing element of the pickup head so that several traverses can be made across a record card, each one reproducing a different set of words or phrases.

Another object of the present invention is to provide a teaching device having the aforesaid capabilities and which is particularly well adapted for ease and economy of manufacture.

A further understanding of the invention, together with more of its objects and advantages will appear from the following detailed description presented in accordance with 35 U.S.C. 112. The use of certain specified materials and the utilization of some details of construction which appear in this description are to be considered as illustrative examples only, rather than as limitations upon the invention or upon the appended claims.

In the drawings:

FIG. 1 is a fragmentary and partially schematic view in perspective of a teaching machine embodying the principles of the present invention;

FIG. 2 is a view in front elevation and partially in section of an integrated teaching machine according to the invention;

FIG. 3 is a plan view in section taken along the line 3—3 of FIG. 2;

FIG. 4 is a view in side elevation and in section taken along the line 4—4 of FIG. 2 showing the pickup head retracted from the recording tape;

FIG. 5 is an enlarged fragmentary view in side elevation and in section showing the pickup head engaged with the recording tape;

FIG. 5A is an enlarged fragmentary view in section taken at line 5A—5A of FIG. 5;

FIG. 9 is a partially schematic view in perspective of another modified form of teaching device according to the invention.

Figure 6:
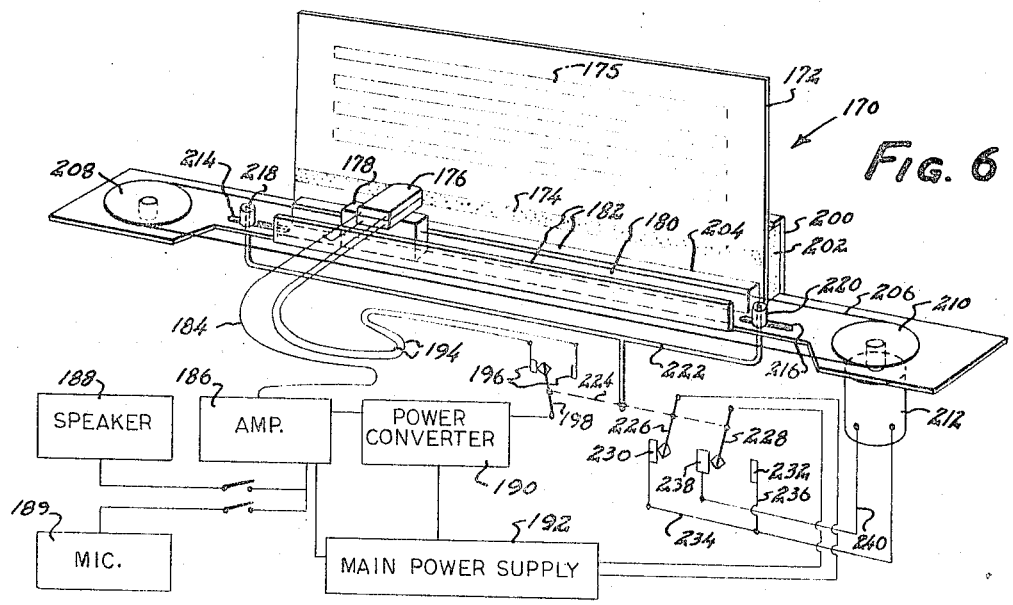
FIG. 6 is a fragmentary and partially schematic view in perspective showing a modified form of teaching device embodying the principles of my invention.

With reference to the drawings, FIGS. 1 through 5 show a teaching apparatus 20 embodying principles of the present invention and comprising, in general, a chassis 22, a holding device 24 on the upper side of the chassis for supporting a teaching card 26, a linearly movable magnetic pickup device 28 positioned to bear against the card 26 and to move along substantially the length of it, a motor 30 for driving the pickup head and a sound reproduction unit 32 connected to the pickup head.

The magnetic pickup device 28 may be of any suitable type commonly used on magnetic tape recording devices and is connected by a flexible lead 34 to an amplifier 36 of the sound reproduction unit 32. The latter may be of conventional design and is, therefore, represented schematically by block components in the drawing which, in addition to the amplifier 36, may include a speaker 38 and a microphone 40 connected to the amplifier by leads 42 and 44, respectively. Manually controllable switches 46 and 48 are provided in the leads 42 and 44, respectively, to enable the operator to selectively record a phrase on the tape segment of a card with the microphone or to play back a prerecorded phrase on the card.

Connected to the amplifier 36 in the arrangement shown is a conventional power supply unit 50 to which power is supplied from a main supply source 52, such as a battery or 110 volt A.C. current through a lead 54. A branch lead 56 from the main power supply lead 54 also supplies power to the motor 30 which drives the magnetic pickup head 28 along a lineal path, as will be seen later. A master control switch 58 is provided in lead 54 between the branch lead 56 and the main power supply.

Each teaching card 26 that is used with any of the embodiments of my invention is preferably made from a fairly stiff paper or cardboard and has a generally rectangular shape with the strip or segment of recording tape 60 extending across the card at a predetermined fixed distance from its bottom edge. When inserted into a machine 20 for use, the card 26 must be held firmly in a fixed position so that the recording tape 60 is automatically aligned with the movable magnetic pickup head 28 and simultaneously above the tape a line 29 of printed matter corresponding to the words recorded on the tape are clearly visible to the operator. As shown in FIGS. 1 to 3, this is accomplished by the holding device 24 which includes an inclined plate 62 that is fixed on edge by means of an angle bracket 64 to the top of the chassis 22. Attached to opposite ends of the plate 62 are a pair of guide brackets 66 and 68 that are spaced apart an amount only slightly greater than the length of the card 26 being used. These brackets may be held in place by screws 70 and the bracket 68 has a slotted arm portion 72 (FIG. 2) so that it can be adjusted to a different position horizontally on the support plate 62 to accommodate longer or shorter cards. The brackets 66 and 68 each have flange portions 74 that turn inwardly to retain the card being used, and these flange members are convergent downwardly toward the mounting plate. Across the lower end of the support plate 62 I may provide a resiliently yieldable backup layer 76 of some material such as a porous rubber strip. The outer surface of this latter strip is spaced from the lower ends of the flanges 74, thereby leaving a longitudinal slot 78 for the lower end of a card to fit within easily, as seen in FIG. 4. The upper ends of the bracket flanges 74 are bent outwardly so that a card may be easily inserted, and when it falls into the slot 78 it rests on the top of the chassis 22 with its tape segment 60 properly oriented above the top and parallel to it, the written or printed phrase on the card 60 above the tape segment being clearly visible to the operator.

To operate properly in conjunction with the tape segment 60 either for recording or play back, the magnetic pickup device 28 must exert a firm pressure against the tape 60 and be moved along it at a constant lineal speed. In order to reproduce the sound from the tape with adequate fidelity, the standard gap on the periphery of the head of the magnetic pickup 28, which designated by the numeral 80 and exaggerated in size in FIG. 5A, must fully engage the tape at all times. If this gap is not always right at the point of tangency where the curved head engages the tape, poor sound pickup and reproduction is the result. In the present invention the resilient backup layer 76 helps to solve this problem by allowing the card, and hence the tape segment to bend slightly when engaged by the pickup head. This causes a greater portion of the pickup head to be engaged by the tape as the head is moved along and assures that the gap 80 is always fully covered by the tape.

In the embodiment of the invention shown in FIGS. 1 to 5, the magnetic pickup device 28 engages the tape segment when going in one direction and on its return stroke it is disengaged from the tape segment so that no recording or sound production will take place on the return stroke. As shown in FIG. 5, the pickup head 28 is preferably mounted firmly in a block 82 of resiliently yieldable material similar to that of the backup strip 76. This block is fixed to a channel shaped support member 84, and attached near opposite ends thereof are the spread apart arms 86 of a V-shaped link which is pivotally connected near the junction of these arms at its lower end to a movable endless belt 88. Approximately at their midpoint the arms 86 pass through spaced apart holes 90 and 92 in a rectangular control plate 94 that is slidably retained in a slot 96 that extends along the top of the chassis 22. The edges of the plate 94 are supported by parallel spaced apart rails 98 that extend along opposite sides of the slot 96 and parallel to the card support plate 62 on the chassis. A third hole 100 between the other two in the control plate 94 provides an opening for the flexible lead 34 that is connected to the magnetic pickup head and to the amplifier 36.

Mounted within the chassis 22 below the slot 96 are a pair of spaced apart pulley wheels 102 and 104 around which the belt 88 extends. The belt may be of any flexible material such as rubber, and fixed to it is a ring-like fitting 106 that has an opening adapted to receive the lower ends of the link arms 86, thereby enabling the link to pivot freely relative to the belt. Thus, as the belt 88 moves continuously in one direction, the link 86 is oriented by the sliding control plate 94. For example, on the play back or record stroke with the pickup head moving from left to right, as viewed in FIG. 1, the lower end of the link 86 is on the portion of the belt 88 closest to the front side of the chassis. The pivotal lower end of the link is thus offset outwardly from the holes of the slidable control plate 94 located above. These holes thus serve as fulcrum points for the link arms, thereby causing the upper ends of the link arms, and thus the movable supporting block 82 and the magnetic pickup head 28 fixed thereto to be urged inwardly against the tape segment 60 on a teaching card 26 being held on the support plate 62. The pickup head stays in this position as it moves along during the entire record or play back stroke. On the return stroke the ring fitting 106 on the belt goes around the idler pulley 104 and thus moves the lower end of the link toward the rear of the chassis. This causes the link arms 86 to pivot at the holes 90 and 92 of the control plate 94, thereby moving the pickup head 28 back away from the tape segment on the card. Thus, on the return stroke the pickup head is not in contact with the tape and no play back or recording takes place, and yet it is not necessary to switch off the sound reproduction system. This is an important feature of this embodiment of my invention.

The electric motor 30 for driving the belt 88 runs continuously after the master switch 58 for the apparatus 20 has been turned on. When a teaching card 26 is in place, the apparatus is started by pushing a cycle control button 108 that starts either a recording cycle or a play back cycle, that is, a stroke in one direction with the pickup 28 against the tape 60 and a return stroke with the head retracted. The cycle control button 108 is located at the front wall of the chassis 22 (see FIGS. 2 to 4), and is connected to a plunger shaft 110 that extends into the chassis 22. Bearing against the inner end 111 of the shaft within the chassis is one end of a channel shaped return member 112 which also bears against a chassis frame member 114. Between the ends of the return member, a bolt 116 extends through it and the chassis frame member 114, and is connected to a washer 118 that retains a compression spring 120 on the bolt 116. The spring 120 thus causes the end of the return member to push the plunger shaft 110 constantly toward the front of the chassis.

Spaced from the inner end 111 of the shaft 110 is a transverse pin 122 that retains one end of a slightly bent V-shaped link 124 which is also pivotally mounted by a pin 125 between its ends on the chassis frame member 114. The other end of the link 124, as shown in FIG. 4, is attached by means of a flexible strap 126 to a rotatable shaft 128. Fixed to the shaft is a relatively large diameter wheel 130 and a concentric cylinder 132 or wheel of a smaller diameter. The shaft 128 is rotatably supported in a vertical position by a U-shaped bracket 134 (FIG. 4). The latter is resiliently flexible and is fixed at its lower end 136 to the bottom of the chassis 22, thereby enabling the wheel 130 and the adjacent cylinder 132 to be movable laterally within the chassis. Connected to the latter support 134 and to a frame portion 138 of the chassis is a spring 140 which constantly urges the wheel 130 and cylinder 132 in one direction.

The motor 30 has a drive shaft 142 that extends vertically and is spaced from a shaft 144 that is connected to and extends downwardly from the pulley member 102. The lower end of the latter shaft 144 is supported in a vertically disposed bearing member 146 fixed to the bottom of the chassis. Below the pulley 102 a relatively large wheel 148 is fixed to the shaft 144. The wheels 130 and 148 and the cylinder 132 preferably have a surface coating of some relatively high friction material such as a rubber composition. The motor drive shaft 142 and the large wheel 148 are so located that when the spring 140 is allowed to pull the shaft support 134 toward the front of the chassis, the motor shaft 142 will engage the large wheel 130 and the cylinder 132 will engage the pinion wheel 148 for the pulley 102, thereby connecting the entire gear train and causing the belt 88 to move instantly at its normal speed.

The cutoff after one complete cycle, that is, one complete revolution (down and back) of the belt and hence the pickup head, is controlled by means of a pivotal control member 150. The latter has a flat, generally triangular body portion and is pivotally mounted at one corner 152 within the chassis beneath the belt. An upturned flange 154 along one end edge of the member 150 extends toward and cooperates with a stop member 156 fixed to the plunger 110 to retain it in the go position when a cycle is initiated by pushing the control button 108 in. Along a longer outer edge of the control member 150 is another upturned flange 158 that forms a cam surface which is engaged by the ring member 106 on the belt 88. A spring 160 connected to the control member 150 and to a chassis frame member 162 constantly gives a counterclockwise torque about its pivot 152, and thereby urges the flange portion 158 against the belt 88 as it goes around the drive pulley 102.

Reviewing now the operation of the apparatus 20, shown in FIGS. 1 to 5, the master switch 58 is first turned to the "on" position, which starts the drive motor 30 and also provides current to the sound reproduction unit 32. With the selector switch 46 turned to the desired mode of operation (e.g. play back) and a teaching card 26 in place between the holding brackets 66 and 68, the cycle control button 108 is pushed inwardly from the "off" position, shown in FIG. 3. Movement of the shaft 110 against the force of the retaining spring 120 moves the link 124 about its pivot 125 and allows the spring 140 to pull the wheel 130 and its concentric cylinder 132 into frictional engagement with the motor drive shaft 142 and the pulley drive wheel 148, respectively. Thus, the power is transmitted through this gear train to drive the pulley 102 and the attached belt 88. The ring fitting 106 carries the link 86 supporting the pickup head 28, and as it goes around the pulley 102, the pickup head swings over to bear against the magnetic tape segment 60 on the card. As the pickup head travels between the two pulleys 102 and 104, the sound reproduction unit 32 plays back the phrase or word previously recorded on the tape, or if the microphone is connected, a phrase can be recorded on the tape. As the ring member 106 goes around the idler pulley 104, the link arms 86 pivot on the control plate 94 and the pickup head is retracted from the record card in place. When it nears the end of the return stroke, the ring member engages the flange 158 on the control member 150 and causes the latter to rotate clockwise, thereby simultaneously moving the short flange 154 away from the stop member 156. This allows the spring 120 to return the shaft 110 and the control button 108 to the nonoperating position which also moves the link 124, and thus the pinion wheel 130 out of contact with the motor drive shaft 142. The pickup head has now stopped and will remain so until the control button 108 is pressed inwardly to initiate another cycle. Any number of cycles can be repeated without having to touch or adjust the card in any away.

As stated above, an important advantage of my control system in the embodiment 20 described thus far is that it eliminates any need to switch the sound reproduction unit 32 on and off. Such switching would cause a severe noise problem in the amplifier, as well as being undesirable from the standpoint of long life for the various electronic components. My system also provides quick response, and repeat cycles can be made easily by merely pushing the control button. Moreover, my device can be cycled for long periods with very little wear of either the mechanical or the electronic components.

In the apparatus 20, as described above, the magnetic pickup device 28 may have one or two heads, depending on whether one or more track is to be produced on the tape segment 60. Since the standard width recording tape can accommodate several tracks, when a pickup device 28 having a double head is used, the apparatus 20 can be provided with the appropriate circuitry and switching so that two separate phrases can be recorded on the same tape segment. For example, when one head is in operation, the instructor's voice can be played back with the correct pronunciation of the words written or printed on the teaching card. Then, by merely switching to the other head of the pickup device, the student can first record and then play back his version of the written phrase.

Figure 7:
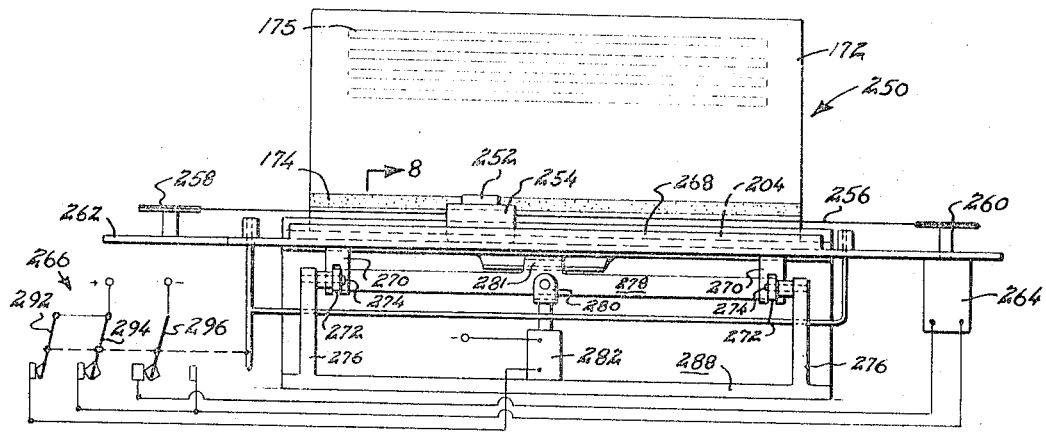
FIG. 7 is a front view in elevation and in section of the device shown in FIG. 6.
Figure 8:
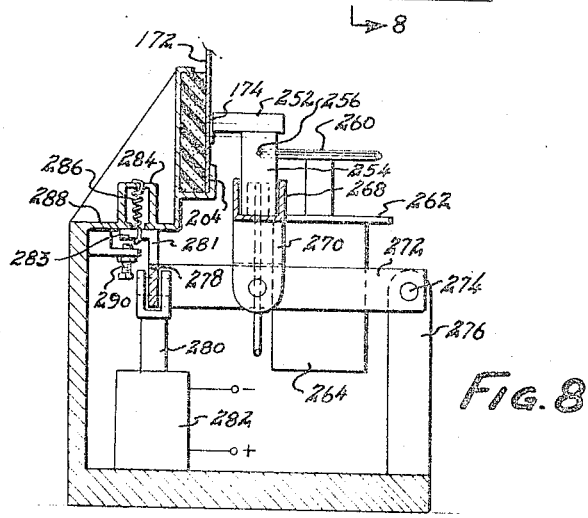
FIG. 8 is a fragmentary view in side elevation and in section taken along line 8—8 of FIG. 7.

In some instances it may be desirable to provide a means for repetitively playing back relatively long phrases or passages that could not be accommodated on a short segment of tape equal in length to the record card. The embodiment of the invention, designated by the numeral 170 and shown in FIGS. 6 to 8, is adapted to overcome this problem and to accommodate teaching cards 172 having two closely adjacent strips of magnetic recording tape or a single strip 174 of tape having a plurality of prerecorded tracks running parallel to its bottom edge. Above the tape strip 174 are lines 175 of written material corresponding to the material prerecorded on the tape.

In the apparatus 170 a magnetic pickup device 176 of the dual head type is utilized which essentially comprises one pickup head mounted below another one. This dual head is fixed to, and preferably resiliently mounted on a support block 178 that is slidably situated in a groove 180 formed by two spaced apart rail members 182. A lead 184 connected to each of the head members on the pickup 176 is connected to the amplifier 186 of a sound reproduction unit that includes a speaker 188, a microphone 189, a power supply unit 190 and a main power source 192, all connected in the same manner as the previous embodiment. Another pair of leads 194 from each of the dual heads of the pickup 176 are connected to the contacts 196 of a double pole switch having a switch arm 198 connected to the power supply unit 190.

The teaching card 172 may be held in a manner similar to that previously shown for the apparatus 20, but for purposes of explanation, a simple retaining plate 200 is shown which may be fixed to the upper side of the apparatus chassis. The front of the plate 200 is provided with a layer 202 of resiliently yieldable material such as sponge rubber so some degree of flexibility of the tape will be afforded when the pickup head is pressed against it. A slot 204 for receiving the teaching card is formed between the layer 202 and an adjacent rail member 182 extending parallel thereto. When a card is in place within the slot 204, the dual pickup head 176 is positioned to normally exert a constant pressure directly against the tape portion 174 on the card.

Attached to opposite ends of the support block are the ends of a drive belt or wire 206 that is looped around spaced apart pulley members 208 and 210 near opposite ends of the groove 180. One pulley 208 is an idler and is merely journaled in the chassis of the apparatus. The other pulley 210 is a driver and is connected to the shaft of a constant speed electrical motor 212. At the ends of the groove 180, and aligned therewith are a pair of slots 214 and 216 and extending upwardly therethrough are a pair of finger members 218 and 220, respectively. These latter fingers are part of a mechanical switch member 222 for controlling both the motor 212 and electronic switching of the pickup head. The switch 222 is connected at its lower end to a link 224, shown schematically in FIG. 6, which in turn is connected to and controls the switch arm 198 that is movable between the contacts 196 that are connected to the two heads of the movable magnetic pickup unit. A triple pole switch having second and third switch arms 226 and 228 also connected to and actuated by the link 224 are movable between the contacts for controlling the polarity of the drive motor 212, and thus the direction of turning of its drive shaft and the pulley 210. The contacts 230 and 232 of the switch are connected by leads 234 and 236 to the motor, and the midcontact 238 is connected by lead 240 to the motor 212. The switch arms 226 and 228 are supplied with D.C. current from the main power supply which symbolizes any suitable power source. It should be readily apparent that although the foregoing describes a thoroughly operable switching system, various forms of switches and other equivalent electrical circuitry may be utilized within the scope of the invention.

In operation, when a teaching card is in place in the apparatus 170, the dual head pickup 176 is initially at its extreme left hand position while being normally pressed against the dual track tape segment on the record card 172. Electric current is supplied simultaneously to the amplifier 186 and the motor 212, causing the pickup head support 178 to be driven by the drive belt 206 from left to right. During this travel the upper head of the pickup unit is operative and sound is reproduced from the upper track of the tape segment on the record card corresponding to a line 175 of writing on its upper end. When the pickup head support 178 nears the right end of the groove 180, as shown in FIG. 6, it engages the switch finger 220, causing the switch 222 to move to the right, which moves simultaneously each of the switch arms 198, 226 and 228. This causes a reversal of the drive motor and simultaneously switches the magnetic pickup unit 176 from the first or upper head to the second or lower head. The pickup head thus simultaneously reverses direction and moves from right to left with the lower pickup head reproducing the sound from the lower track on the tape segment 174. When the pickup head support reaches the extreme left hand position it engages the switch finger 218, thereby moving the three switch arms 198, 226 and 228 to the off or the starting position again.

In still another embodiment of the present invention, an apparatus 250, shown in FIGS. 7 and 8, has a means for holding the record card 172, which may be the same as that shown in the apparatus 70. Here, a magnetic pickup unit 252 having a single head may be mounted on a similar form of support 254 that is connected to a drive belt 256 or wire extending around a pair of pulleys 258 and 260 which are mounted near opposite ends of a vertically movable beam 262. The pulley 260 is connected to the drive shaft of a reversible electric motor 264 that is controlled by a three pole switch 266 in the same manner as previously described. The movable support 254 for the magnetic pickup head 252 is slidably mounted in a channel member 268 which is fixed to the vertically movable beam 262. Thus, in the embodiment of FIGS. 7 and 8, either the single head magnetic pickup unit can be used to play back both tracks of a dual track tape with a back and forth sweep, or a dual head pickup unit can be utilized to play back all four tracks of a four track tape by sweeping back and forth across the record card four times. As shown, the channel member 268 is connected at opposite ends to vertical supports 270, each of which is attached to a pivotal link 272. The latter links are pivotally connected at one end 274 to the chassis frame 276 and at the other end to a cross beam 278. Centrally attached to the cross beam is the actuating arm 280 of a solenoid 282 which is also fixed to the chassis frame. Fixed to the cross beam 278 is an inverted L-shaped link 281 having a flange 283 connected to a spring 286 which is secured to a portion 284 of the frame 276, thereby urging the flange against a top portion of the chassis 288. When in this position, as shown in FIG. 8, the magnetic head 252 is in register horizontally with the top track of the dual track tape 174 on the teaching card in place. A set screw 290 fixed to the chassis frame serves to limit the downward travel of the solenoid arm 280 and by proper adjustment can thus cause the magnetic tape to register properly with the lower track on the tape segment 174 for the return cycle from right to left.

The solenoid 282 is provided with D.C. current and is energized when the motor 264 is reversed at the end of one sweep by means of the switch 266 which operates in the same manner as in the previous embodiment. Actuation of the switch at the end of the first sweep from left to right, moves three switch arms 292, 294 and 296, and causes a reversal in polarity of current to the motor 264 and the solenoid 282. When the solenoid is energized, the arm 280 of the solenoid and consequently the channel-like track 268 moves downwardly a predetermined amount that puts the pickup head in register with the lower track of the magnetic tape segment on the teaching card. When the pickup head 252 completes its return sweep to the original starting point, the switch 266 is actuated back to the original position, the solenoid is de-energized, and the spring 286 raises the beam 262 and the pickup head 252 to the upper track position.

In another modified form of the present invention, shown in FIG. 9, an apparatus 300 is provided having a roller type holder 302 for accommodating a larger type sheet or card 304 having a multiplicity of written lines 306 and several strips 308 of magnetic tape at the bottom portion of the card or sheet. This roller type holder includes end frame members 310 supporting a typewriter form of roller 312, and a plate member 314 across the upper ends of the frame member 310. A slotted retainer member 316 is attached at its ends to the upper plate 134 and is spaced a short distance away from it. It has a longitudinally extending window 318 so that when the line to be amplified or spoken is shown therein, the proper tape 308 will be registered on the roller 312 with a movable magnetic pickup head 320. For purposes of illustration, this feature of the invention is also shown with the magnetic pickup head mounted on a slidable support 322 within a channel-like track 324. Again, a pair of pulley members 326 and 328 mounted on and spaced apart on the apparatus 300 are utilized for supporting belt or wire 330 which is attached to a slidable support 322 for the magnetic head 320. The pulley member 328 is driven by a reversible electric motor 332, and switch means 334, as heretofore described, may be used for reversing the motor at the end of its sweep. The pickup head 320 is connected to a similar type sound reproduction unit 336, as heretofore described in detail in connection with the other embodiments of the invention. It is to be understood that the roller type holder for larger sized cards and sheet may be used with any of the aforementioned arrangements for a pickup head, whether they be the one head or two head type.

From the foregoing, it should be apparent that the present invention provides a highly versatile and useful teaching apparatus. It is contemplated that a typical procedure for using the apparatus will involve the use of a large plurality of cards or several relatively long sheets having a multiplicity of tape segments if the latter roller type feed mechanism is utilized. Each written line on the cards or sheets may be a word or phrase of a foreign language that the student is attempting to master. Each card can be quickly placed in position and the machine can be actuated to audibly reproduce the correct pronunciation of the written words. The sound can be repeated over and over again as the student views the written passage. The result is a rapid learning process, both in reading and conversing in a language.

In all of the aforementioned embodiments of my invention, either a play back or a recording mode can be accomplished on any given traverse of the pickup head device. This may be controlled merely by switching to either the speaker or the microphone of the sound reproduction system. Also, on multiple track tapes separate tracks can be utilized for passages spoken by either the student or a teacher, and appropriate switching, as discussed previously, will enable the separate tracks to be recorded or played back as desired. In this way my invention affords a unique versatility and is capable of accommodating a wide range of teaching techniques.

Throughout the application, including the claims, the term "recording tape" is meant to include any recording medium which can be placed on the surface of a teaching card, and the term "pickup head or device" is intended to include any device capable of reacting with the recording medium through a sound reproduction unit to establish a reproducible sound imprint on the recording medium or to play back the sound imprint that has been established thereon.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A phonetic teaching device for use in combination with a card having a strip of magnetic recording tape extending across its lower end and writing or printing thereon above the tape related to the spoken words that have been prerecorded on the tape, said device comprising:
    (1) a chassis;
    (2) a sound producing and reproduction system mounted within said chassis including a power supply, an amplifier, speaker means, and a pickup head;
    (3) means for holding said card stationary on said chassis in a predetermined upright position;
    (4) a pair of pulleys mounted in said chassis near opposite ends of the card being held and endless flexible belt means on said pulleys;
    (5) means for driving one said pulley and thus said belt means at a constant predetermined linear rate;
    (6) means connected to said belt means for driving said pickup head and for urging said pickup head against a tape segment on a card during one direction of travel between said pulleys and for retracting said pickup head from the tape segment during travel in the opposite direction.

2. The device as described in claim 1 wherein said means for holding said card includes stop means on said chassis for restraining the ends and for supporting the bottom of the card, and a longitudinally extending layer of resilient material for supporting the back of said card and located in back of the tape strip thereon.

3. The device as described in claim 1 wherein said latter means includes a link means pivotally attached at one end to said belt means and to said pickup head at its other end; and a slidable fulcrum means engaged by said link means between its ends, said fulcrum means causing the end of said link means attached to said pickup head to move transversely to a line between said pulleys as the link means goes around a pulley, thereby moving the pickup head against the tape during the start of a run and retracting it therefrom after the end of a run.

4. The device as described in claim 3 wherein said fulcrum means comprises a plate slidably supported between longitudinal rail members on said chassis, said link means extending through openings in said fulcrum means.

5. A phonetic teaching device for use in combination with a card having a strip of magnetic recording tape extending across its lower end and writing or printing thereon above the tape related to the spoken words that have been prerecorded on the tape, said device comprising:
    (1) a chassis;
    (2) a sound producing and reproduction system mounted within said chassis including a power supply, an amplifier, speaker means and a pickup head;
    (3) means for holding said card stationary on said chassis in a predetermined upright position;
    (4) means for driving said pickup head in a reversible linear path adjacent the card being held, said means including a pair of pulleys mounted in said chassis near opposite ends of the card, an endless belt means extending around said pulleys and a motor constantly running when said device is on;
    (5) link means pivotally attached to said belt means for moving said pickup head against a tape strip on the card in at least one direction of travel between the pulleys;
    (6) and means for drivingly interconnecting one of said pulleys with said motor to move said pickup head in one direction from a starting point near one end of a card and for reversing the direction of movement of said pickup head to return it to its starting point and for automatically disconnecting said motor to stop said pickup head after it has returned to the starting point.

6. The device as described in claim 5 wherein said latter means comprises a pinion gear means normally urged into a position drivingly interconnecting the motor and one of said pulleys, plunger means normally holding said pinion gear means in the disconnected position and movable to the operating position to release the pinion means and cause it to move to the drive position, latch means for maintaining said plunger means in the operating position, and means responsive to the movement of said belt means for release of said latch means, whereby said plunger is returned to its nonoperating position.

7. A phonetic teaching device for use in combination with a flexible sheet having a plurality of strips of magnetic recording tape extending across its lower end and a plurality of lines with writing or printing thereon above the tape strips, each said line being related to the spoken words prerecorded on said strip of tape, said device comprising:
    (1) a sound reproduction system including a power supply, an amplifier, speaker means and a pickup head;
    (2) means for supporting said pickup head for reversible linear travel back and forth on said device;

(3) support means for holding said sheet stationary on said device with a preselected tape strip being held in a predetermined position adjacent the said linear path of said pickup head, a rotatable roller for advancing said sheet to an adjacent tape strip, and an upper frame portion of said support means for surrounding the line corresponding to the tape strip adjacent the pickup head;

(4) and means for driving said pickup head at a constant predetermined linear rate in a straight line path and for simultaneously urging said pickup head against the adjacent tape segment.

8. A phonetic teaching device for use in combination with a card having a strip of magnetic recording tape extending across its lower end, said tape having two sound tracks, and writing or printing thereon above the tape strip related to the spoken words prerecorded thereon, said device comprising:

(1) a sound reproduction system including a power supply, an amplifier, speaker means and a dual pickup head assembly with one pickup head mounted directly above the other;

(2) means for supporting said pickup head for reversible linear travel on said device;

(3) means for holding said card in a predetermined stationary position on said device with said dual track tape strip adjacent the linear path of said pickup head;

(4) means for driving said pickup head at a constant predetermined linear rate in a straight line path with said dual pickup head against the tape segment and one of said heads electrically connected to said sound reproduction system;

(5) means for reversing the direction of travel of said pickup head when it has reached the end of the tape strip;

(6) and means for electrically switching from said one pickup head to the other pickup head when change in direction of travel thereof occurs.

9. A phonetic teaching device for use in combination with a card having a strip of magnetic recording tape extending across its lower end, said tape having two sound tracks, and writing or printing thereon above the tape strip related to the spoken words prerecorded thereon, said device comprising:

(1) a chassis;

(2) a sound reproduction system including a power supply, an amplifier, and speaker means within said chassis and a dual pickup head assembly with one pickup head mounted directly above the other;

(3) a linear track means fixed to said chassis and a mounting means slidably disposed in said track means for supporting said pickup head for reversible linear travel on said chassis;

(4) means for holding said card in a predetermined stationary position on said device with said dual track tape strip adjacent the linear path of said pickup head;

(5) a belt means connected to said mounting means and extended spaced apart pulleys on said chassis;

(6) reversible motor means for driving a pulley, and thus said dual pickup head at a constant predetermined linear rate in a straight line path while said dual pickup head bears against the tape segment and one of said heads is electrically connected to said sound reproduction system;

(7) switch means responsive to the movement of said mounting means for reversing the direction of travel of said pickup head when it has reached the end of the tape strip and for electrically switching from said one pickup head to the other pickup head when change in direction of travel thereof occurs.

10. A phonetic teaching device for use in combination with a card having a strip of magnetic recording tape extending across its lower end, said tape having two parallel sound tracks along its length, and writing or printing thereon above the tape strip related to the spoken words prerecorded thereon, said device comprising:

(1) a chassis;

(2) a sound reproduction system in said chassis including a power supply, an amplifier, speaker means and a pickup head;

(3) means on said chassis for holding said card in a predetermined stationary position with its dual track tape strip adjacent said pickup head;

(4) vertically movable support means on said chassis;

(5) mounting means on said movable support means supporting said pickup head for linear horizontal travel;

(6) means including a motor for driving said pickup head in said support means at a constant predetermined linear rate in a straight line path with said pickup head against the tape segment;

(7) means for reversing the horizontal direction of travel of said pickup head when it has reached the end of the tape strip;

(8) and means for moving said support means and thus said pickup head vertically when its horizontal direction is reversed, whereby the other track of the tape strip is engaged by the pickup head.

11. The device as described in claim 10 wherein said support means is connected to link means pivotally attached to said chassis; a solenoid on said chassis having an actuating arm fixed to said support means; and switch means responsive to said mounting means for actuating said solenoid to move the support means vertically as the motor is reversed.

References Cited

UNITED STATES PATENTS

| | | | |
|---|---|---|---|
| 2,849,542 | 8/1958 | MacChesney | 35—35.3 |
| 3,020,360 | 2/1962 | Gratian et al. | 35—35.3 |
| 3,255,537 | 6/1966 | Cole et al. | 35—35.3 |
| 3,289,326 | 12/1966 | Bender | 35—35.3 |
| 3,307,274 | 3/1967 | Glaser | 35—35.3 |

EUGENE R. CAPOZIO, *Primary Examiner.*

W. H. GRIEB, *Assistant Examiner.*